United States Patent [19]

Hilfinger

[11] Patent Number: 4,628,606
[45] Date of Patent: Dec. 16, 1986

[54] TRIMMER FOR DRY SHAVER

[75] Inventor: Peter Hilfinger, Bad Homburg, Fed. Rep. of Germany

[73] Assignee: Braun Aktiengesellschaft, Kronberg, Fed. Rep. of Germany

[21] Appl. No.: 760,201

[22] Filed: Jul. 29, 1985

[30] Foreign Application Priority Data

Aug. 2, 1984 [DE] Fed. Rep. of Germany ....... 3428487

[51] Int. Cl.⁴ .............................................. B26B 19/10
[52] U.S. Cl. ...................................... 30/34.1; 30/43.92
[58] Field of Search .................... 30/34.1, 43.92, 210, 30/329, 43, 45; D28/45

[56] References Cited

U.S. PATENT DOCUMENTS

| 3,855,697 | 12/1979 | Meyer et al. | 30/34.1 |
| 3,909,938 | 10/1975 | Brenneman et al. | 30/34.1 |
| 3,967,372 | 7/1976 | Beck et al. | 30/34.1 |
| 4,085,503 | 4/1978 | Beck et al. | 30/34.1 |
| 4,262,415 | 4/1981 | Braun | 30/34.1 |

FOREIGN PATENT DOCUMENTS

| 2058646 | 11/1970 | Fed. Rep. of Germany . |
| 2836959 | 3/1980 | Fed. Rep. of Germany . |
| 3031918 | 8/1980 | Fed. Rep. of Germany . |
| 56558 | 5/1978 | Japan . |
| 98853 | 8/1979 | Japan . |
| 480922 | 12/1969 | Switzerland . |

Primary Examiner—Harold D. Whitehead
Assistant Examiner—Maurina Rachuba
Attorney, Agent, or Firm—Raymond J. De Vellis

[57] ABSTRACT

A trimmer for dry shavers having cutting screen mounted integral with the appliance and a cutter movable reciprocally along said cutting screen, formed of a cutter blade and a support. The support of the cutter is manufactured by the injection-molding technique and the cutter blade is injection-molded onto it when manufactured. Recesses of different shapes with central constrictions are provided in the cutter blade to receive the support material, said constrictions, despite the shrinkage of the support material, ensuring a secure zero-play material connection between the support and the cutter blade.

8 Claims, 5 Drawing Figures

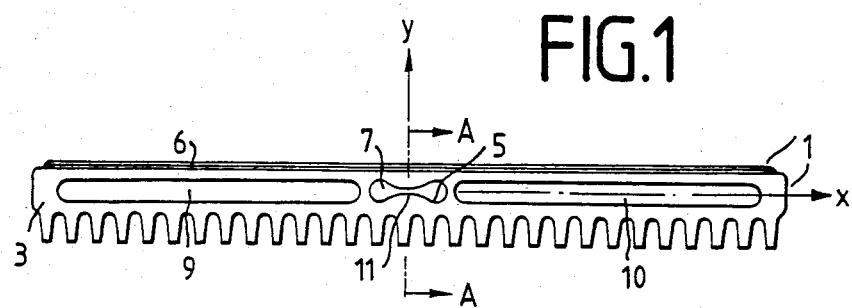
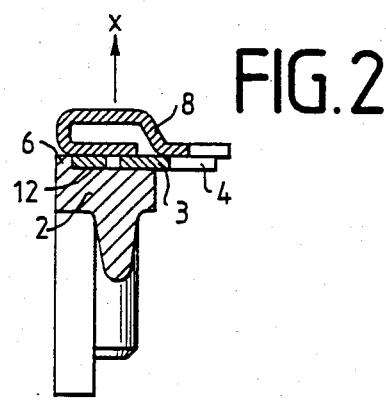
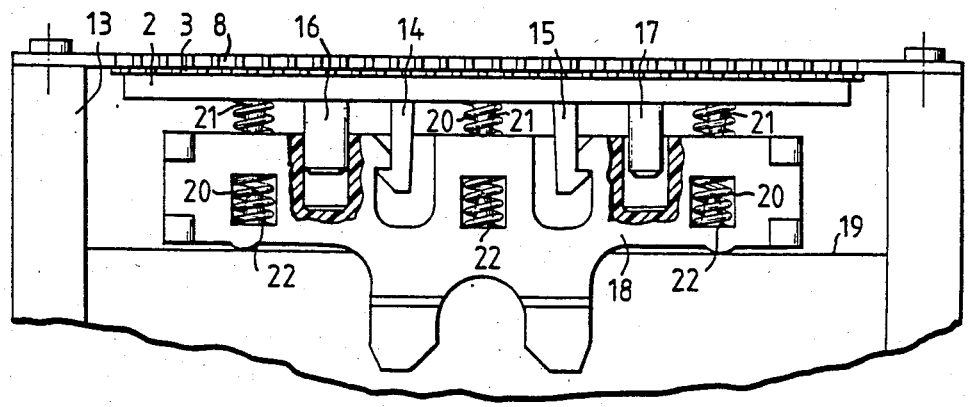

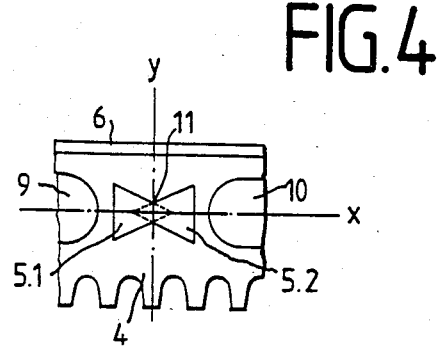
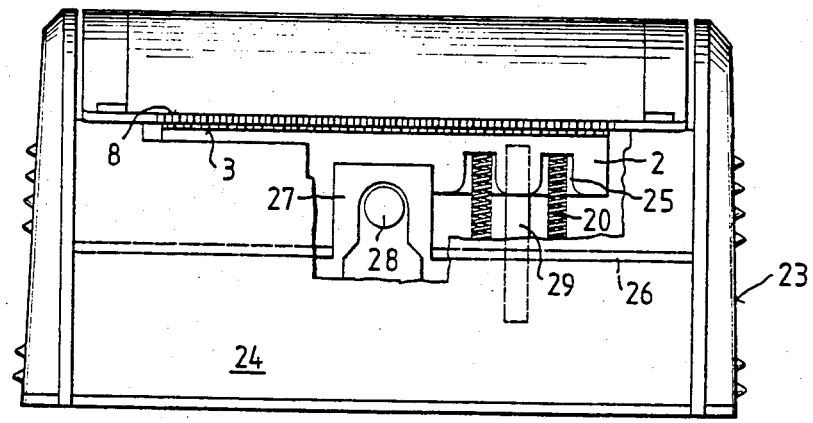

TRIMMER FOR DRY SHAVER

BACKGROUND OF THE INVENTION

The invention relates to a trimmer for a dry shaver with a fixed cutting screen and a cutter, reciprocally movable rectilinearly along said screen and pressed against it by compression springs, consisting of a flat cutter blade and a support made of a plastic material.

In the known trimmer, provided in a shaver of the applicant sold under the name of Braun sixtant compact two-way, the use of a flat cutter blade manufactured by etching, is made possible by a positive fastening of the cutter blade to a support moved back and forth on the appliance, said support constituting a bending-resistant unit with the cutter blade in question. The positive attachment of the cutter blade is provided by means of a plurality of bumps formed on the support, which penetrate matching openings in the cutter blade and attach the latter to the support. This type of attachment of the cutter blade to the support is too costly from the manufacturing standpoint, since the zero-play attachment of the cutter blade to the support required allows no tolerance in the diameters of the bumps or in the receiving openings or in the distance of the bumps from the receiving openings. It has also been found that even a small amount of play due to tolerances between the bumps and receiving openings, after the trimmer has been used for some time, results in intensified wear phenomena on the bumps, which has a disadvantageous effect on the cutting action of the trimmer.

SUMMARY OF THE INVENTION

The goal of the invention is to provide a cutter fitted with a flat cutter blade for the trimmer of a dry shaver, wherein reliable and zero-play entrainment of the cutter blade by the support of the cutter is ensured, with elimination of the disadvantages listed above.

This goal is achieved according to the invention by virtue of the fact that a one-piece bending-resistant unit is formed by injection-molding the support onto the cutter blade and by the fact that the cutter blade is disposed in a specified position on the support and securely fastened thereto by means of a recess provided in the cutter blade, comprising a constriction filled by the material of the support, and a supporting strip located on the support.

As a consequence of the direct attachment of the support to the cutter blade during its manufacture, all tolerances and tolerance chains related to the components that serve to fasten and hold the cutter blade to the support are eliminated. The cutter blade, after the support is produced, forms together with the latter a cutter which is in one piece. The support strip provided on the support as well as the recess provided on the cutter blade and having a constriction, into which the material of the support flows to form a bump during its manufacture, ensure reliable attachment of the cutter blade to the support and receive all the forces acting on the cutter blade during use.

The special design of the recess in the cutter blade, by virtue of the constriction provided, ensures that the cutter blade and the support can be combined into a single unit by the injection process, since the shrinking process that occurs when the injected support cools has no effect, at least in the area of the constriction, ensuring zero-play, strong attachment between the cutter blade and the support.

According to the invention, the lengthwise dimension of the recess in the cutter blade runs parallel to the cutting plane of the cutting blade, whereby the constriction is provided in the central part of the length.

An optimum arrangement in fastening the cutter blade to the support is provided by virtue of the fact that the transverse axis that intersects the lengthwise axis of the recess coincides with the transverse axis of the cutter blade.

The narrowest point of the constriction of the recess according to the invention is preferably located on the transverse axis that passes through the recess.

According to a preferred embodiment of the invention, the design of the recess is made in the form of a mirror image on each side on the basis of the transverse axis that divides the recess at the center.

The recess in the cutter blade which serves for injection can be given different designs with the same functional safety. According to one preferred embodiment of the invention, the recess is formed from two circular recesses provided on either side of the transverse axis, said recesses being linked by a constricted area of the recess.

The same success can be achieved, however, if the recess consists of two trapezoidal recesses provided on either side of the transverse axis, the corners of which trapezoids point toward one another and merge with one another by overlapping slightly to form the constriction.

To ensure a definite functionally correct position and secure attachment of the cutter blade attached directly to the support, a supporting strip is provided on the supporting surface of the cutter blade on the support, running in the direction of movement of the support.

Preferably, the support strip is part of the support. The bump which fills the recess in the cutter blade, according to the invention, is part of the support and is formed by directly injecting the support onto the cutter blade.

This design for a connection between the cutter blade and the support on the cutter of the trimmer according to the invention produces a compact self-contained bending-resistant unit, which can be easily and quickly fitted into the trimmer.

BRIEF DESCRIPTION OF THE DRAWINGS

Further advantages and details of the invention will be apparent from the description and drawing below, in which preferred embodiments are shown:

FIG. 1 is a top view of the cutter blade injection-molded onto the support of the cutter of the trimmer according to the invention, FIG. 2 is a cross section through the cutter blade along line A—A in FIG. 1, FIG. 3 is a side view of the trimmer consisting of the cutting screen, cutter, compression springs, and drive slide, FIG. 4 is a version of the recess which is used to injection-mold the cutter blade onto the support, and FIG. 5 is a shaving head with cutting screen, cutter, compression springs, and housing support.

DESCRIPTION OF THE PREFERRED EMBODIMENTS

As FIGS. 1–3 show, cutter 1 of the trimmer according to the invention consists of a support 2 and a cutter blade 3 injection-molded thereon. Support 2 in this case has a rectangular cross section, with blade 3 resting flat on its wide, upper surface in such fashion that its toothed cutting area 4 comes to rest outside the circumference of body 2, whereby support 2, however, extends toward cutting area 4 as far as is possible without interfering with shaving.

Cutter blade 3 used here is manufactured by a electro-depositing or etching technique, and is characterized by the special thinness of its material, which results in a practically optimum shave because the hair is thereby cut extremely short.

This extremely thin cutter blade 3, according to the invention, is firmly attached to support 2 by injection molding during its manufacture to form a unit. Before support 2 is injection-molded, cutter blade 3 is placed in the injection-molding tool in such fashion that, after injection molding as shown in FIG. 2, it comes to rest on top of the support. During the injection-molding process, a recess or opening 5 with a special shape in cutter blade 3 is filled by the material which is injected into the tool and forms support 2, thus holding cutter blade 3 to support 2. In addition, a supporting strip 6 is formed by the injected material within the tool forming the support, said strip 6 serving as a support for cutter blade 3 injection-molded onto support 2 and thus, together with material 7 which is formed by injection molding and fills recesses 5, produces an exact geometric positioning of the cutter blade with respect to support 2.

To reduce friction between the cutter blade and fixed cutting screen 8, which can be differently shaped, i.e. folded back as shown in FIG. 2 or flat as shown in FIG. 3, the cutter blade has depressions 9 and 10 on the side facing the cutting screen, said depressions terminating a short distance before recess 5. The flat surface of cutter blade 3 which surrounds depressions 9 and 10 as well as recess 5 forms a sliding surface for cutting screen 8.

Recess 5 in cutter blade 3 has an elongated shape aligned parallel to cutting area 4 or support strip 6, whose lengthwise axis x preferably coincides with the central axis which runs parallel to the cutting area and divides support surface 12 on support 2.

Transverse axis y which intersects recess 5 at its center simultaneously divides cutter blade 3 into two congruent halves and lies on the transverse axis which divides support surface 12 at the center.

Recess 5 and cutter blade 3, in order to ensure secure attachment of the cutter blade to support 3, has a special design, whose characteristic feature is that the two lengthwise sides of recess 5, beginning at the outer widest distances from transverse axis y, run together in the direction of lengthwise axis x, to form a constriction 11. The narrowest point of constriction 11 in recess 5 preferably lies on transverse axis y. Starting at transverse axis y which divides recess 5, the shape of recess 5 on both sides of the transverse axis is preferably made in the form of mirror images.

Two especially advantageous designs for recess 5 with constriction 11 are shown in FIGS. 1 and 4.

Recess 5 according to FIG. 1 consists of two circular end areas provided at a distance from transverse axis y, said end areas being connected together by means of a cut-out area which tapers toward transverse axis y and forms constriction 11.

Recess 5 shown in FIG. 4, which can be provided instead of the recess shown in FIG. 1, consists of two trapezoidal recesses 5.1 and 5.2 provided on both sides of transverse axis y, the corners of whose trapezoids, pointed toward one another, overlap each other slightly and in this fashion form constriction 11, in other words the distance of the side walls of the trapezoidal recesses with respect to transverse axis y, and running parallel to transverse axis y, is selected so that the desired width of the constriction is produced.

The special effect achieved by constriction 11 in recess 5 consists in the fact that the shrinkage of injected material 7 which cools in the recess, is negligibly small in the vicinity of the constriction because of the increasingly tapered width of the slot, and is not sufficient to cause the material to be torn away from the side walls of recess 5 that form the constriction. The provision of cutter blade 3 on support 2, explained above in detail, on the one hand produces a fixed zero-play connection of the two elements and on the other hand ensures that this connection will withstand, in the long term, all the stresses that occur during the operation of the reciprocating cutter blade. The force of the swing in each direction of motion of the support acts in the direction of the narrowest point in constriction 11 and is transferred by means of the side walls of recess 5 which in each case taper toward the transverse axis directly to cutter blade 3.

Support 2 of the trimmer according to the invention can have a different shape on the side that faces away from cutter blade 3. Two possible designs are shown in FIGS. 3 and 5.

According to FIG. 3, a cutting screen 8 is permanently attached to a slide switch 13 on the shaver. The cutter blade according to the invention rests sliding-fashion against cutting screen 8 with cutter blade 3 attached to support 2. Locking means 14 and 15 as well as pins 16 and 17 are molded on support 2 on the side facing away from cutter blade 3, said locking means and pins engaging matching recesses in a drive slide 18, which is coupled or decoupled by slide switch 13 with a drive motor of the shaver, not shown. Drive slide 18 moves on a slide track 19 molded onto slide switch 13. Compression springs 20, provided between drive slide 8 and support 2, strictly positioned by means of guide bumps 21 and 22 molded onto support 2 and on the drive slide, press, by means of a preset pressure, on the one hand the cutter blade against cutting screen 8 and on the other hand drive slide 18 against track 19.

FIG. 5 shows the shaving head 23 of a dry shaver with a partial section through the front housing wall 24. Recesses 25 are provided in support 2 of the movable cutter blade according to the invention, which recesses compression springs 20 engage, said springs abutting a support strip 26 molded in housing wall 24 and indicated by the dashed lines. Recesses 25 define the length and the pressure point of compressions springs 20 in support 2 and press the latter together with injection-molded cutter blade 3 against cutting screen 8 mounted on shaving head 23. Fork 27 molded on support 2 transmits the oscillating motion of drive pin 28 meshed therewith to support 2 and thus to cutter blade 3.

Guide strip 29 holds the cutter blade slidably against the inside wall of housing wall 24.

The partial section in FIG. 5 shows, starting at the midline, only one side of support 2 with cutter blade 3 as well as two compression springs 20 and a guide strip 29. It is understood that the left side is a mirror image.

While embodiments and an application of this invention have been shown and described, it will be apparent that many more modifications are possible without departing from the inventive concepts herein described. The invention, therefore, is not to be restricted except as is necessary by the prior art and by the spirit of the appended claims.

What is claimed as new and desired to be secured by Letters Patent of the United States is:

1. In a dry shaver having a housing, a trimmer comprising:

a cutting comb firmly fastened to the housing;

a substantially planar cutting blade cooperating with the cutting comb, said cutting blade including an aperture having a constricted portion;

a plastic injection-molded support member;

means for attaching said support member to said cutting blade for securely mounting said cutting blade to said support member and for forming a structural unit resistant to bending, said attaching means including an integrally, injection-molded portion of said support member protruding through said aperture of said cutting blade and also including a support strip integrally injection-molded with said support member, said cutting blade and said support member being reciprocally movable rectilinearly lengthwise with respect to the comb; and biasing means for biasing said support member and said cutting blade against the cutting comb.

2. The trimmer according to claim 1 wherein the lengthwise extent of said aperture in said cutting blade is parallel to the cutting area of said cutting blade and whereby said constricted portion of said aperture is located in the middle area of the lengthwise extent of said aperture.

3. The trimmer according to claim 1 wherein said aperture has a lengthwise axis (x) and wherein said cutting blade and said aperture have the same transverse axis (y) which intersects the lengthwise axis (x).

4. The trimmer according to claim 3 wherein the narrowest portion of said constricted portion of said aperture lies on the transverse axis (y).

5. The trimmer according to claim 4 in which said aperture is formed of a mirror image on either side starting at the transverse axis (y) which divides said aperture.

6. The trimmer according to claim 5 wherein said aperture is formed of two generally circular portions provided on either side of the transverse axis (y), said circular portions being connected by said constricted portion.

7. The trimmer according to claim 5 wherein said aperture is formed of two generally trapezoidal shaped portions provided on either side of the transverse axis (y), the corners of said trapezoid portions pointing toward one another and merging in a slight overlap to form said constricted portion.

8. The trimmer according to claim 1 wherein said cutting blade has a support surface and said support strip is provided on said support surface in the direction of movement of said support member.

* * * * *